US005855430A

United States Patent [19]

Coushaine et al.

[11] Patent Number: 5,855,430

[45] Date of Patent: Jan. 5, 1999

[54] VEHICLE HEADLAMP ASSEMBLY

[75] Inventors: Charles M. Coushaine, Rindge; Michael D. Tucker, Henniker, both of N.H.; George J. English, Reading, Mass.

[73] Assignee: Osram Sylvania Inc., Danvers, Mass.

[21] Appl. No.: 803,742

[22] Filed: Feb. 21, 1997

[51] Int. Cl.[6] .............................. B60Q 1/00; H01R 33/00

[52] U.S. Cl. .......................... 362/519; 362/514; 362/516; 362/548; 362/549; 362/226

[58] Field of Search ............................. 362/61, 226, 459, 362/512, 514, 516, 519, 548, 549

[56] References Cited

U.S. PATENT DOCUMENTS

| | | | |
|---|---|---|---|
| 2,253,616 | 8/1941 | Falge | 362/226 |
| 3,511,982 | 5/1970 | Salter | 362/382 |
| 4,219,870 | 8/1980 | Haraden et al. | 362/226 |
| 4,507,712 | 3/1985 | Dolan et al. | 362/61 |
| 4,513,356 | 4/1985 | Mikola | 362/226 |
| 4,679,128 | 7/1987 | Van Duyn et al. | 362/306 |
| 4,682,274 | 7/1987 | Freudenreich et al. | 362/61 |
| 4,774,645 | 9/1988 | Iwamoto | 362/226 |
| 4,841,419 | 6/1989 | Ohishi | 362/226 |
| 4,893,218 | 1/1990 | Dilk et al. | 362/61 |
| 4,922,388 | 5/1990 | Freudenreich | 362/61 |
| 4,969,072 | 11/1990 | Pye | 362/310 |
| 5,010,455 | 4/1991 | Luallin et al. | 362/61 |
| 5,402,325 | 3/1995 | Wisler et al. | 362/61 |
| 5,541,821 | 7/1996 | Murakami | 362/294 |
| 5,618,097 | 4/1997 | Coushaine | 362/61 |
| 5,634,705 | 6/1997 | Michino | 362/61 |
| 5,639,154 | 6/1997 | Kusagaya et al. | 362/61 |
| 5,651,603 | 7/1997 | Doring | 362/61 |
| 5,722,758 | 3/1998 | Huang | 362/61 |

*Primary Examiner*—Ira S. Lazarus
*Assistant Examiner*—Ljiljana V. Ciric
*Attorney, Agent, or Firm*—William E. Meyer

[57] ABSTRACT

A vehicle headlamp system having optical reflector, lamp capsule, and gasket is disclosed. The vehicle headlamp system uses surfaces formed as part of the optical surface yielding located light source. As a result, the light source is more accurately positioned with respect to the reflector, and a more accurate beam pattern is formed. The lamp capsule is assisted in its location by a spring to force the capsule in proper location. The headlamp system no longer uses an O-ring to provide location, but an improved flat resilient gasket provides a sealing and locking force to maintain proper face to face coupling. The preferred lamp capsule uses a cup to shield light reflected from the press seal. The preferred lamp capsule uses a cup, and pedestal system mounting providing five axes of light source positioning. The preferred lamp capsule uses a clip coupling to join the light source holder to the plastic base.

20 Claims, 10 Drawing Sheets

VEHICLE HEADLAMP ASSEMBLY

The invention relates to electric lamps, and in particular to headlamps with inserted lamp capsules. More in particular, the invention relates to the coupling structure between a headlamp reflector and a light source lamp capsule.

BACKGROUND ART

Vehicle headlamps are presently made in roughly two pieces. There is a reflector section which includes the essential optical reflector, and other housing features such as a lens cover, mounting and aiming hardware. The second element is the replaceable light source, or capsule that latches in place in the reflector. The pattern of light that appears on the road is the result of both elements, and great effort has been made in improving both elements. Further demands for smaller, more compact headlamps, requires even more control in the manufacture of the reflector and the lamp capsule. In a 10 centimeter high headlamp, the misplacement of the light source with respect to the reflector by as little as quarter of a millimeter can have a bothersome effect on the beam pattern at 100 meters distance. Such misdirection of the beam pattern is one cause of the unpleasant glare drivers experience with oncoming vehicles. There is then a need to improve the accurate location of the light source with respect to the reflector in vehicle headlamps.

Previously, the reflector passage, where the lamp capsule is inserted has been defined along with its various coupling features by the exterior side mold wall. It is common in plastic molding to experience variations in the process, resulting in variations in the final product. Such variations as wall thickness, and surface location can occur due to wear in the mold parts, misplacement between the mold parts, variations in the mold material, flashing and other molding defects. The result here is an irregular variation in the dimensions between the inside optical surface, and the exterior surface. This variation leads to irregular axial (Z direction) location of the light source. There is then a need for a headlamp system that prevents variations in the molding process from effecting the axial positioning of the lamp.

In the past, the reflector and lamp capsule were manufactured with a small, but nonetheless, real tolerance gap measured radially between reflector passage diameter, and the lamp capsule diameter. This radial wiggle room allowed the capsule to be inserted into the back of the reflector. In the final coupling, an O-ring seal filled and sealed this gap or wiggle room. The O-ring then acted to finally position the lamp capsule. Nonetheless, due to manufacturing variations, flashing on the seal, flashing on the seal surfaces, too little grease, inaccurate seal pinching, and over or under pressing of the seal, the capsule could be twisted or displaced radially (X, Y directions) from the proper lamp axis direction. This type of variation leads to irregular beam pointing. There is then a need for a headlamp system that prevents variations in the radial positioning of the lamp capsule.

DISCLOSURE OF THE INVENTION

A improved vehicle headlamp system can be formed with an optical reflector having a optical surface side, and a wall defining a passage formed therethrough. The wall in the passage area includes an axial locating surface, a planar locating surface, each locating surface being co-formed with the optical surface so as to be dimensionally invariant in manufacture with respect to the optical surface. A lamp capsule coupled into the reflector is formed having an axial locating surface, a planar locating surface. The axial and planar locating surfaces of the optical reflector being positioned to be adjacent the respective locating surfaces of the lamp capsule.

BEST MODE FOR CARRYING OUT THE INVENTION

Figure 1:
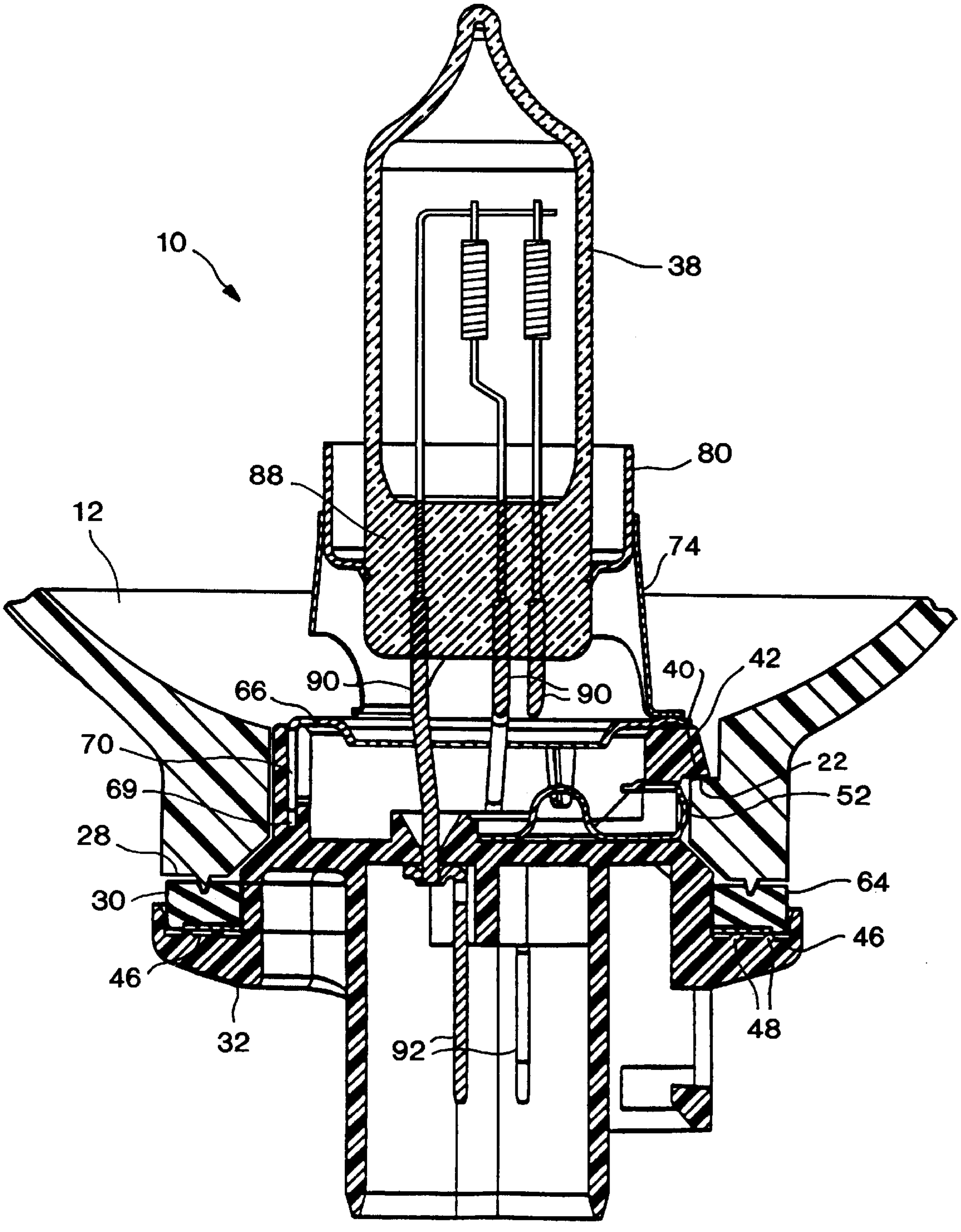
FIG. 1 shows a cross sectional view of a preferred embodiment of a vehicle headlamp system partially broken away.

FIG. 1 shows a cross sectional view of a preferred embodiment of a vehicle headlamp system partially broken away. Like reference numbers designate like or corresponding parts throughout the drawings and specification. The vehicle headlamp system 10 is assembled from an optical reflector 12, a lamp capsule 32, and a gasket 64. Additional mounting, aiming, sealing, venting, and similar headlamp features may be selected or used according to designer choice as known in the art.

Figure 2:
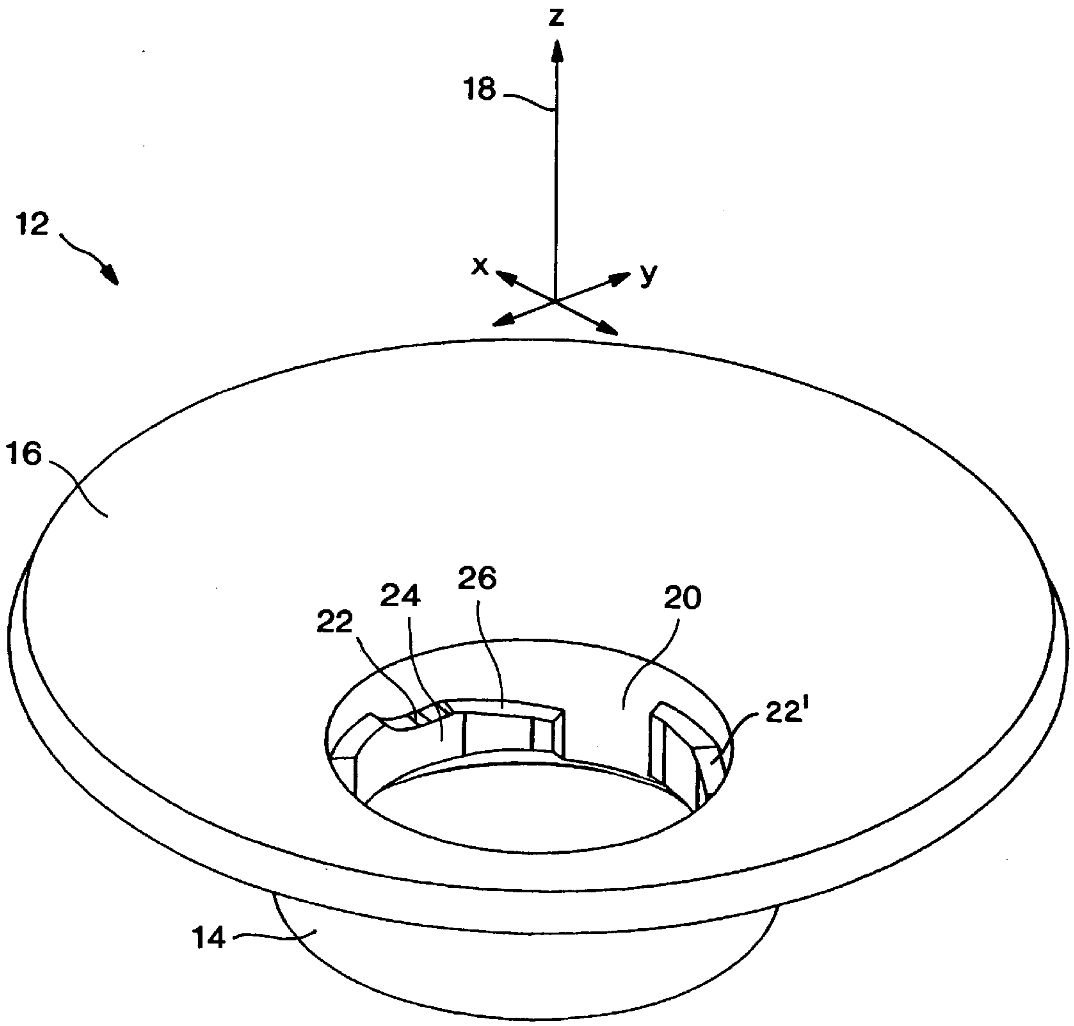
FIG. 2 shows a perspective view of an optical reflector, partially broken away.

FIG. 2 shows a perspective view of an optical reflector 12, partially broken away. The optical reflector 12 may be made out of molded plastic, such as a filled bulk molding material or other molding material as known in the art. The reflector has the general form of a concave shell with an exterior, (or rear) side 14 and an interior, or forward reflective side, referred to here as the optical surface 16. The optical surface 16 is designed to provide a desired headlamp beam pattern as known in the art. The optical surface 16 may be formed as a female side on a highly accurate mold wall (male side) referred to here as the mold wall for the optical surface 16. The opposing mold face, the one forming the exterior side 14, will be referred to as the mold wall for the exterior side. The reflector 12 is initially formed by molding the plastic fill material between the optical side wall and the exterior side wall of a mold. In the molding process, the optical surface 16 is then accurately replicated in the molded plastic by the intimate contact between the mold wall for the optical surface 16 and the plastic fill material. The optical surface 16 may thereafter be coated, if necessary, with various reflective and protective layers. These additional layers are not shown.

Extending in a forward direction from the optical surface 16, is an optical axis 18, generally indicating the direction of the final headlamp beam. It is understood that the reflector 12 may be enclosed on the front side by a clear cover lens that may or may not include beam directing lens elements. The reflector may be supported by aiming hardware, and enclosed in a housing as is generally known in the art. The cover lens, aiming hardware, and housing designs are matters of designer choice, and are not important with respect to the present invention.

The optical reflector 12 also has an internal wall 20 defining a passage extending axially between the exterior surface 14, and the optical surface 16. Formed on the internal wall 20 are one or more axial positioning surfaces 22, and one or more planar positioning surface 24. The axial positioning surface 22 and the planar positioning surface 24 may be formed as extensions of the optical surface 16 by making the two simultaneously as part of the same mold wall for the optical surface 16. The axial positioning surface 22 then provides an accurate locating surface that the lamp capsule 32 can be directly positioned against for proper location of the lamp capsule 32 in the axial direction 18 (the Z direction). The axial positioning surface 22 may be formed as a depression or concavity in an in-leading ramp 26 facing in the forward axial direction 18 to thereby locate the lamp capsule 32 exactly with reference to the optical surface 16. Since the axial positioning surface 22 and ramp 26 are actually continuations of the optical surface 16, there can be no manufacturing dimensional variation between the optical surface 16 and the positioning surface 22.

In the preferred embodiment, the axial positioning surface 22 and the lead in ramp 26 are repeated as a pattern in two other locations (a second positioning surface is shown as 22' and a second planar locating surface is shown as 24' the remaining albeit similar surfaces are not shown) around the internal wall 20. The in-leading ramps 26, may terminate respectively in notched depressions serving as locating surfaces 22, 22' and a similar one not shown that can then capture follower arms 42 extending radially from the lamp capsule 32. The three preferred axial positioning surfaces 22 are located approximately equiangularly around the internal wall 20.

Also positioned along internal wall 20 is the planar positioning surface 24 for locating the capsule relative to the X and Y plane. The planar positioning surface 24 may also be formed as an extension of the optical surface 16 by making the two with the same mold wall for the optical surface 16. The planar positioning surface 24 provides a locating surface that the lamp capsule 32 uses for proper positioning in directions orthogonal to the optical axis 18 (X and Y directions). The planar locating surface 24 may be formed as a flat or curved face on the internal wall 20 of the reflector passage, the normal of which is orthogonal to the optical axis 18. The preferred planar positioning surface 24 comprises a circular cylindrical wall section positioned as a section of the internal wall 20 deforming the reflector passage. The curved section can then give both X and Y locating positions.

Figure 3:
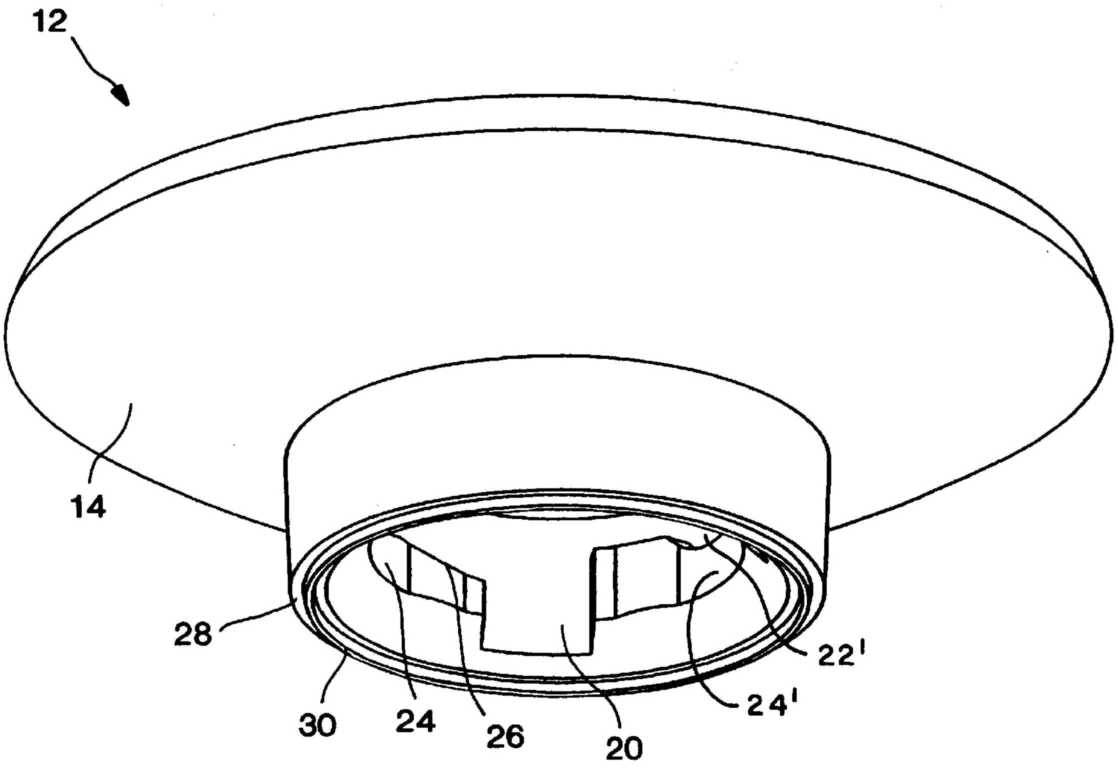
FIG. 3 shows a perspective view of the optical reflector, partially broken away.

FIG. 3 shows an exterior end (back side) view of the reflector partially broken away, the internal wall 20, and a reflector sealing surface 28. Positioned along optical reflector 12 is a reflector sealing surface 28. The reflector sealing surface 28 allows the reflector passage to be sealed from the flow of gas, vapor or water to thereby prevent the reflector cavity and light source from having condensed water, dirt or other material interfere with the lamp operation. The preferred reflector sealing surface 28 is a flat ring, whose normal is approximately parallel to the optical axis 18. The flat ring, which may be circular or otherwise, extends on the reflector 12's exterior side 14 around the reflector passage. The preferred sealing surface 28 includes one or more projecting ribs 30 to enhance sealing.

Figure 4:
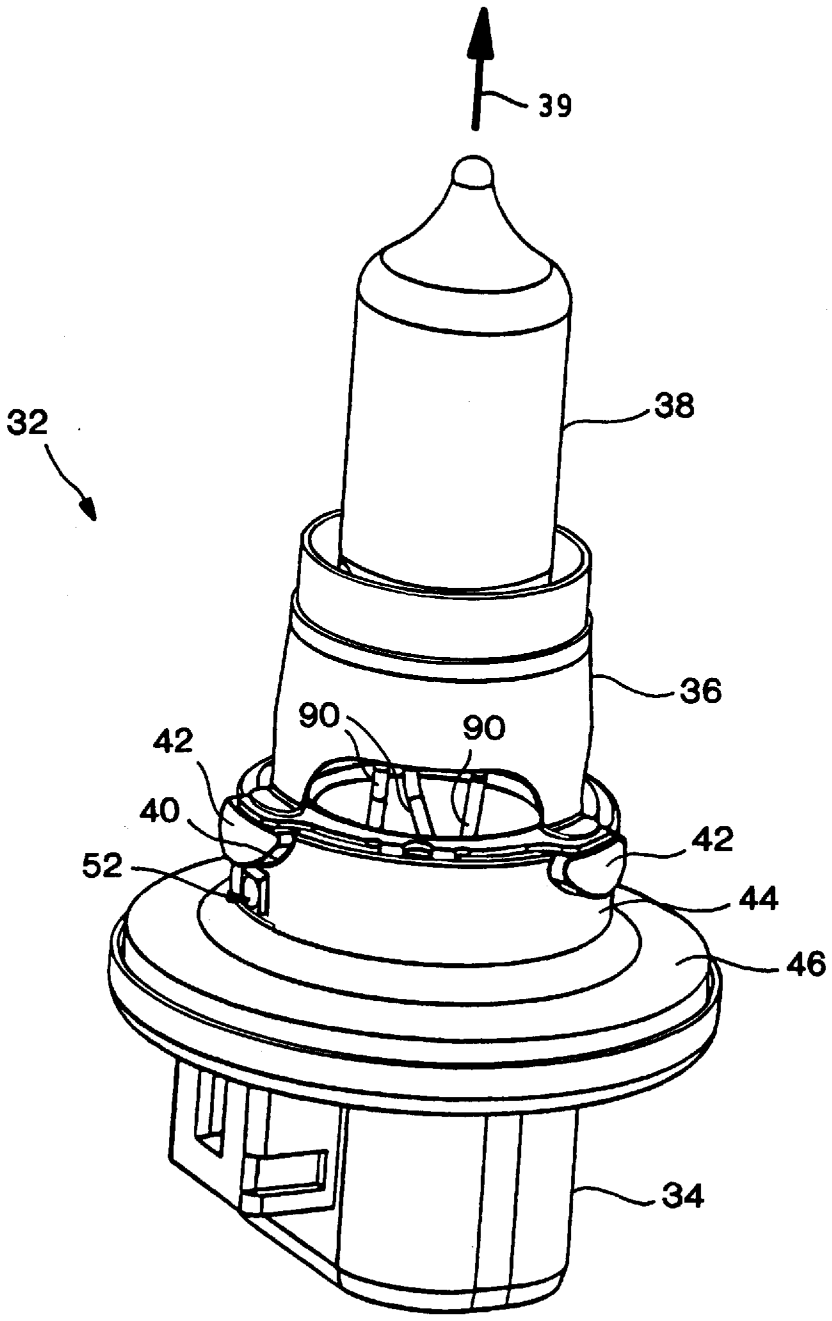
FIG. 4 shows a first perspective view of a lamp capsule.

FIG. 4 shows a first perspective view of a lamp capsule 32.

Figure 5:
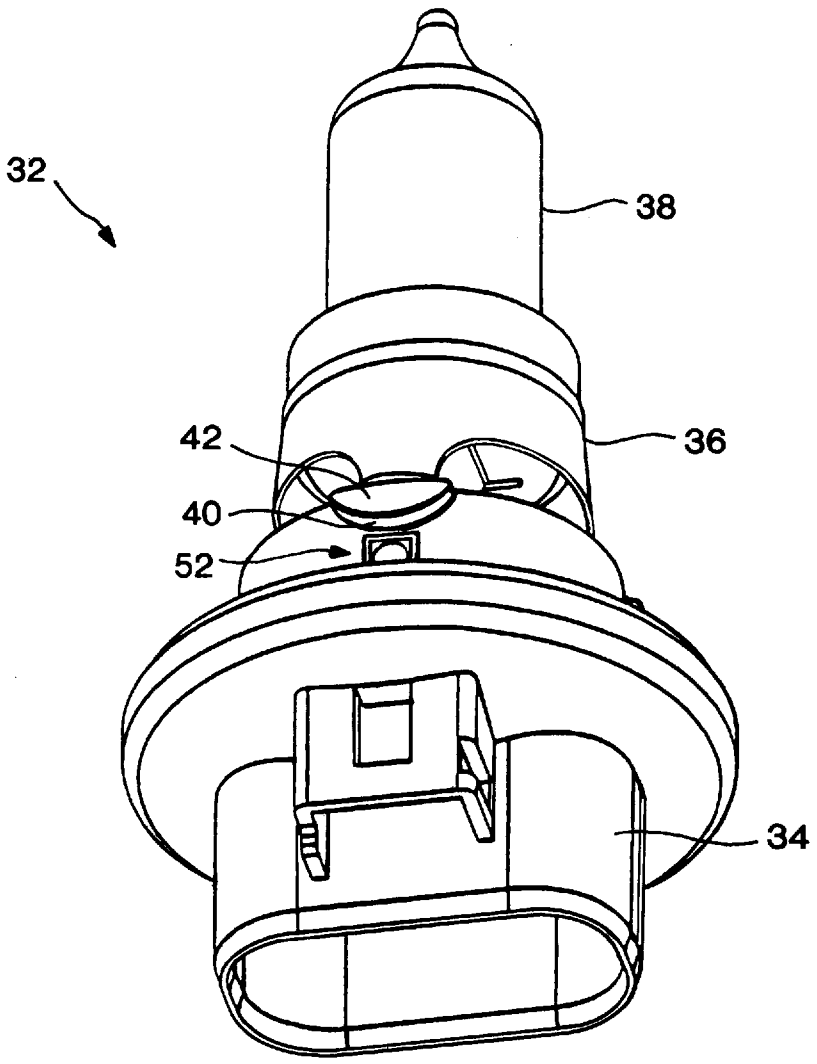
FIG. 5 shows a second perspective view of a lamp capsule.

FIG. 5 shows a second perspective view of the lamp capsule 32. The lamp capsule 32 may be made with a plastic base 34 of plastic resin, or filled plastic resin. Coupled to the plastic base 34 may be a metal holder 36, and held in the metal holder 36 may be a light source 38. The light source 38 has an envelope axis 39. The optical reflector 12 is designed to couple and seal with the lamp capsule 32. The lamp capsule 32 has an axial locating surface 40, a planar locating surface 44, a capsule sealing surface 46, and a spring bias 52. There are numerous base and metal holder designs allowing for accurate positioning of the light source with respect to the lamp capsule.

The preferred base 34 is roughly a plastic tube adapted with coupling, locating and sealing features that then supports a metal holder 36 that clamps to a light source 38. The preferred light source 38 is a tungsten halogen lamp bulb. It is understood that the light source 38 may be an arc discharge source. With respect to the axial and planar location features described above in the coupling of the capsule to the reflector, the light source and holding method are matters of design choice. The preferred inventive design is disclosed below. Other light source designs and holding methods may be used with the reflector coupling design.

In the preferred embodiment, positioned along lamp capsule 32 is at least one axial locating surface 40. The axial positioning surface 22 of the reflector is designed to mate face to face with the axial locating surface 40 of the lamp capsule 32. When the two surfaces 22 and 40 are properly seated one to the other, the lamp capsule 32 is then properly positioned with respect to the optical surface 16 along the optical axis 18 (Z direction). The preferred lamp capsule 32 axial positioning surfaces 40 are the lower (exterior side) facing surfaces of three short, arms 42, extending orthogonal to the lamp axis from the lamp capsule 32. When the lamp capsule 32 is inserted in the reflector 12, each arm 42, passes inward sufficiently to slide up on a corresponding in-lead ramp 26, formed on the reflector 12. By rotating the lamp capsule 32, the arms 42 are forced up the ramps 26, thereby advancing the lamp capsule 32 along the optical axis (Z direction) while compressing the gasket 64. Once the arms 42, reach the inner ends of the in-lead ramps 26, the axial locating surfaces 40 abut the positioning surfaces 22, which may be formed with retaining depressions or slots, and are held in place by the resilient compression of gasket 64.

Also, positioned along lamp capsule 32 is a planar locating surface 44. The planar positioning surface 24 of the reflector 12 is designed to mate face to face with the planar locating surface 44 of the lamp capsule 32. When the planar positioning surface 24, and the planar locating surface 44 are properly seated one to the other, the lamp capsule 32 is then properly positioned in the X and Y directions with respect to the optical axis 18 (Z direction). The preferred capsule planar locating surface 44 comprises a cylindrical face formed on side of the base 34 extending parallel to the optical axis 18. The preferred planar positioning surface 24 of the reflector and the planar locating surface 44 of the plastic base 34 are formed to be conformal with each other when the lamp capsule 32 is properly positioned in the reflector 12.

Positioned along lamp capsule 32 is a sealing surface 46. The capsule sealing surface 46 allows the lamp capsule 32 to be sealed to the gasket 64, and thereby close off the reflector passage. The preferred capsule sealing surface 46 is a flat ring, whose normal is approximately parallel to the optical axis 18. The ring, which may be circular or otherwise, extends around the lamp capsule 32 so as to follow along and to mate with the gasket 64 which is also mated to the corresponding reflector sealing surface 28. The sealing surface 46 may also include one or more projecting ribs 48 extending along the length of the sealing surface 46 to help stabilize the gasket 64 position and enhance sealing.

Figure 6:
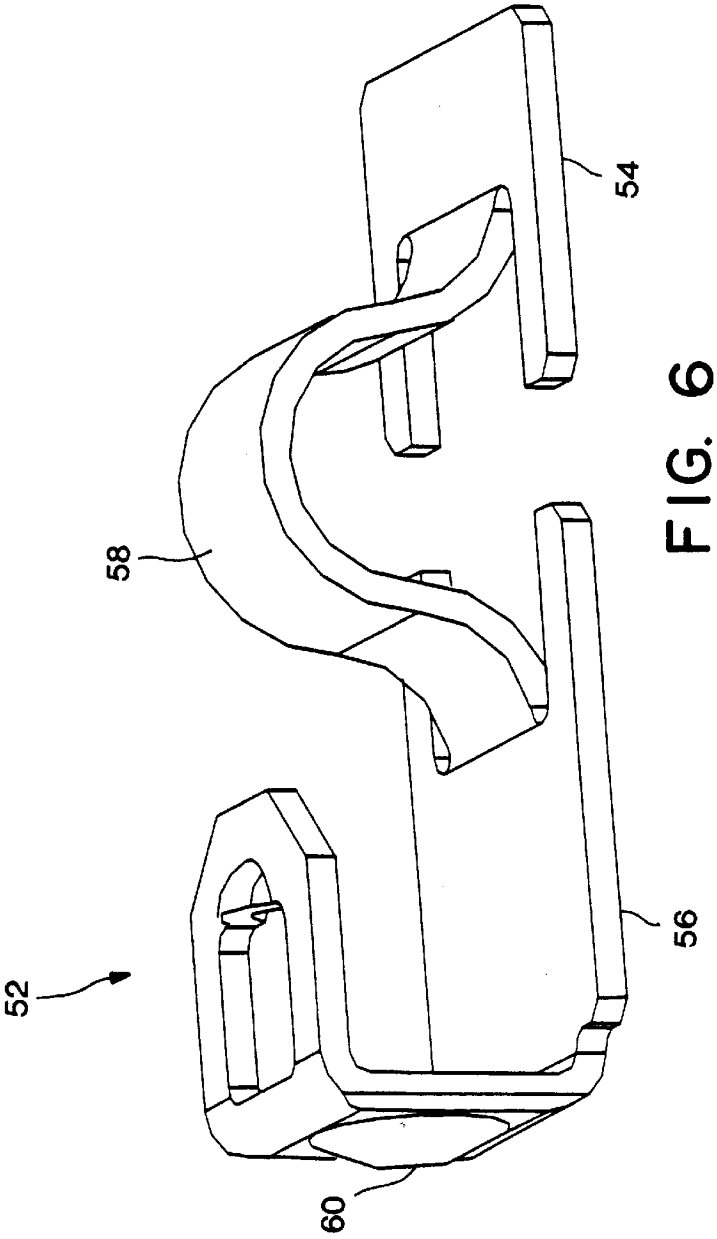
FIG. 6 shows perspective view of a spring bias.

The headlamp system 10 may additionally include a spring bias 52. The spring bias 52 is positioned to act between the internal wall 20 and the lamp capsule 32 so as to press between the reflector and the lamp capsule 32 in a direction orthogonal to the lamp axis 18. FIG. 6 shows perspective view of a spring bias. In the preferred embodiment, the spring bias 52 comprises a resilient metal piece with an inner foot 54 and an outer foot 56 joined by a resilient spring section 58 of curved metal. Rising from an outer end of the outer feet 54, 56 is a contact face 60. The preferred spring bias 52 is located in a cavity 62 formed in the lamp capsule. The feet act as guides to retain and direct the action of the spring bias. When the inner foot 54 is properly positioned, the outer foot 56 can be moved (slide in the cavity) by the spring force and thereby apply pressure through the contact face 60 that can slide and press on the internal wall 20. A slide and helical spring could be used, as a less preferred alternative. An additional alternative is a flexible curved band spring, having couplings at one or both ends coupled to the exterior wall of the lamp capsule 32. For example, the plastic base 34 may include one or two axially extending slots along the exterior. The spring bias may be formed with tips that fit and bind the lamp capsule 32 to the spring bias. In this form, the spring bias is an arced band located in the formed passage, between the reflector and the holder having an uncompressed form that is not conformal with either the adjacent reflector wall or the adjacent holder wall. In any case, with rotation, the spring bias 52 is compressed by advancing against the interior wall 20, or the side of ramp 26 on the adjacent reflector interior wall, thereby exerting in a direction perpendicular to the axis 18, a locating force from the reflector 12 to the lamp capsule 32 hereby driving the planar locating and positioning surfaces into abutment. A similar second spring bias may be used with reference to a second set of planar positioning surface. Locating the spring bias on the reflector is a less preferred variation, since it would be less expensive to replace the lamp capsule than to replace the reflector.

Figure 7:
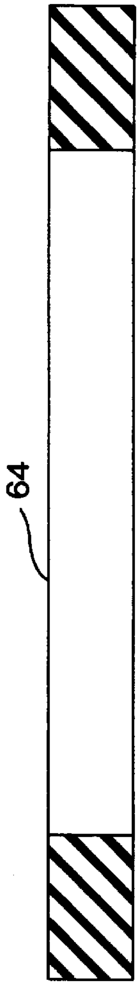
FIG. 7 shows cross sectional view a gasket.

FIG. 7 shows a cross-sectional view a gasket 64. The gasket 64 may be made out of any convenient, resilient compressible sealing material such as resilient plastic, or rubber material to have the general form of a flat ring that is roughly circumferentially conformal with the reflector sealing surface 28 and the capsule sealing surface 46. The gasket may include ribs, indentations or other formed features to guide its position or enhance sealing. The optical reflector 12 then seals to the gasket 64 on one side, and the lamp capsule 32 seals to the gasket 64 on the opposite side. The preferred gasket 64 is a flat ring of silicon rubber. In the present configuration, the gasket 64 does not determine the X, Y or Z location of the lamp capsule 32, but only seals the through passage and provides a tension to hold the lamp capsule 32 against the proper Z locating surface.

Figure 8:
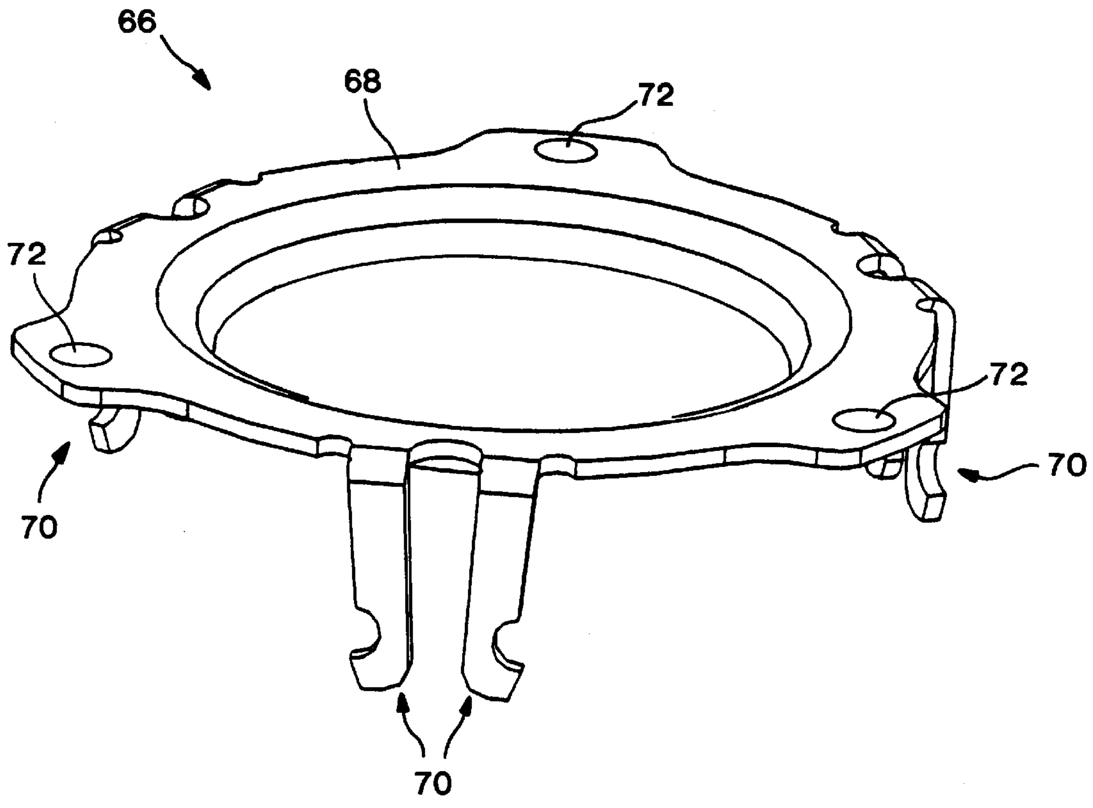
FIG. 8 shows a perspective view of a support plate.

FIG. 8 shows a perspective view of or coupler 66. The preferred clip ring 66 is designed to clip couple to the base 34. The preferred clip ring 66 has the general form of a flat ring 68 with perpendicular, resilient mounting tongues to snap fit (clip) to retaining notches 69 formed in the plastic base 34. In one embodiment four pairs (one is not shown) of metal tongues 70 with latching notches extend from the ring 68. The tongues 70 may be formed to latch in slots formed in the plastic base 34 with the ring 68 generally positioned adjacent an upper end of the plastic base 34. Contact points 72 for mounting to, such as three weld points, are formed on the ring 68, preferably in a plane perpendicular to the lamp axis.

Figure 9:
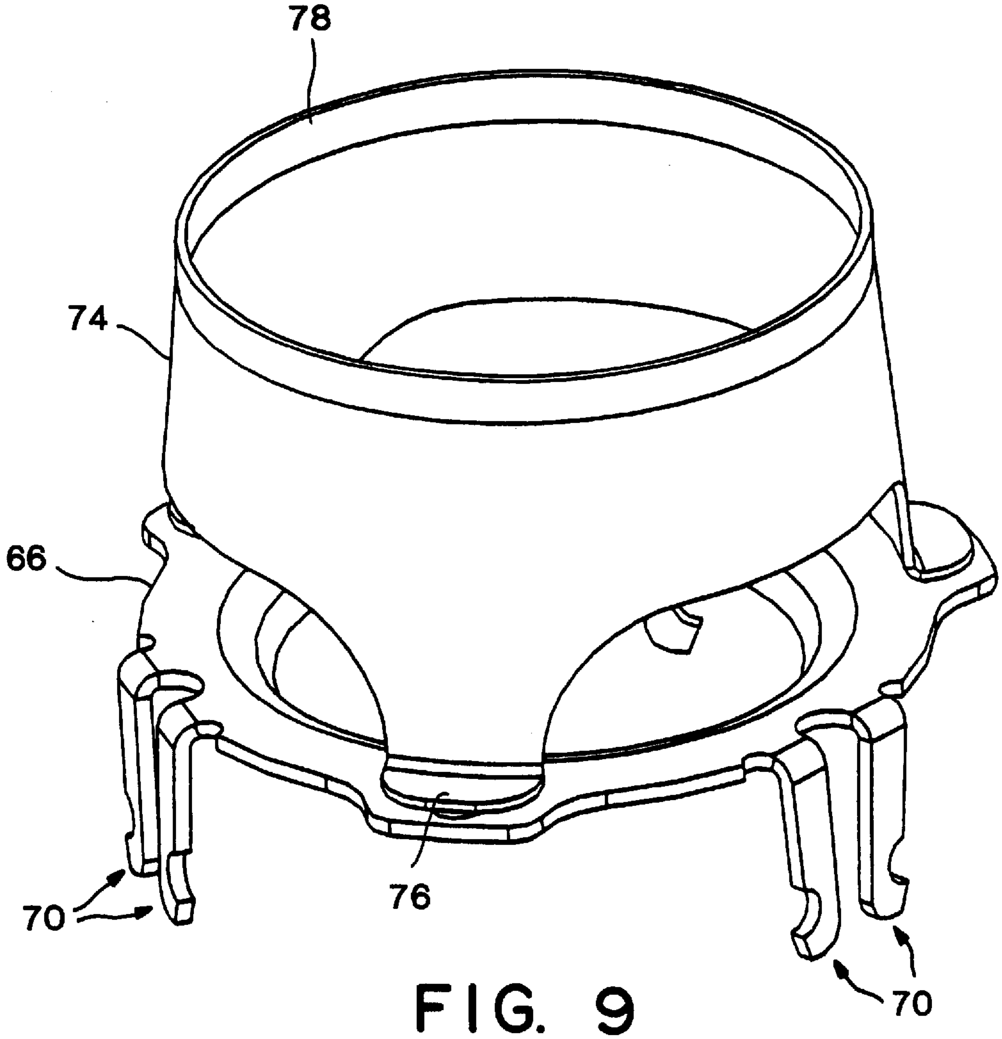
FIG. 9 shows a perspective view of a support plate and support ring.

FIG. 9 shows a perspective view of a clip ring 66 coupled to the pedestal 74. The clip ring 66 may be welded at the contact points 72 to a pedestal 74. The preferred pedestal 74 has the general form of a hollow cylinder with formed extensions to couple to the contact points 72 of the clip ring 66. In the preferred embodiment, the pedestal 74 has three legs with turned out feet 76 for welding to the three weld points (contact points 72) of the clip ring 66. Shifting the feet 76 on the contact points 72 prior to welding provides movement of the pedestal 74 with reference to the clip ring 66. This allows two axes of adjustment location for the light source. Formed on the upper end face of the pedestal 74 is a mounting surface 78 to make a rotational contact surface. The mounting surface 78 may be a section of a spherical surface, or preferably a circular cylinder for adjustable, rotational contact thereto.

Figure 10:
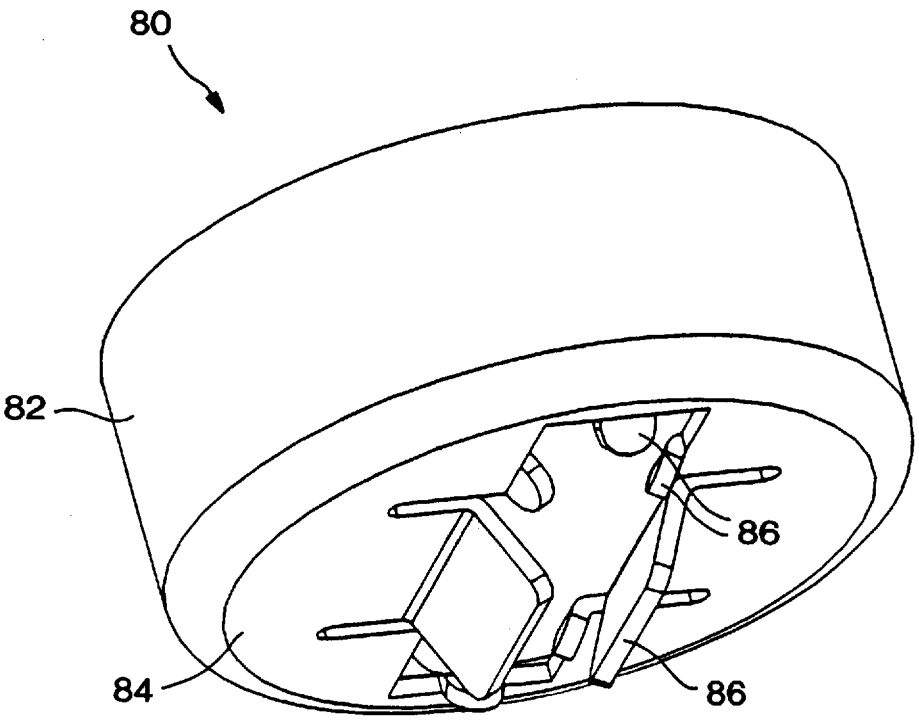
FIG. 10 shows a perspective view of a holding cup.

FIG. 10 shows a perspective view of a holding cup 80. The holding cup 80 has the general form of a cup with a sidewall 82 and a bottom 84. Formed in the bottom 84 is a hole with latching features designed to couple to the press seal 88 end of a light source 38. Numerous latching feature designs are known in the art. The preferred embodiment uses bent spring tabs 86 that latch in indentations formed in the press seal 88 portion of the light source 38. The holding cup 80 includes a mounting surface to be positioned along the mounting surface 78 of the pedestal 74, and to be coupled thereto once proper position of the light source 38 is achieved. The sidewall 82 may serve as the locating surface for mating with the mounting surface 78. A slight gap between the mounting surface 78 and the sidewall 82 allows the cup 80 to be slid back and forth, rotated and pitched side to side to provide three more axes of adjustment location for the light source 38, giving five axes of adjustment total.

The preferred sidewall 82 extends up from the press seal 88 region of the light source to extend axially parallel to, although somewhat radially offset from the light source 38, at least cover (encircle) the region of the press seal 88, and preferably somewhat beyond. The pedestal 74 may additionally provide some of this coverage. It should be understood that the press seal 88 in this context is meant to include of the envelope region from where it starts to be deformed, through the actual seal region where light from the light source may reasonably be expected to be reflected or refracted. This curved or deformed material region is commonly irregularly formed during the pressing process, and light from the light source contacting it can be reflected or refracted by it in irregular directions, resulting in uncontrolled light that may become unwanted glare. Other light may also pass back onto the holder and support structures, resulting in irregular light projection in the beam. The cup 80 limits or stops the development of such stray light. The sidewall 82 of the support cup 80 then acts as a light block for light exiting from or reflecting from the press seal 88 region of the light source 38. Such cup 80 shielded light is otherwise optically uncontrolled, and for the most part would result in glare. In FIGS. 4 and 5, view of the press seal 88 region of the light source is blocked by the holding cup 80. The inside of the support cup 80 may be blackened to reduce reflection. A substantial portion of such light can then be block by extending the cup sidewall 82 far enough along the envelope wall. It is understood that a small portion of light may pass from the press seal 88 back generally towards the light source, and such light would not be blocked. The offset openness the ring clip 66, the pedestal 74, and the cup

Figure 11:
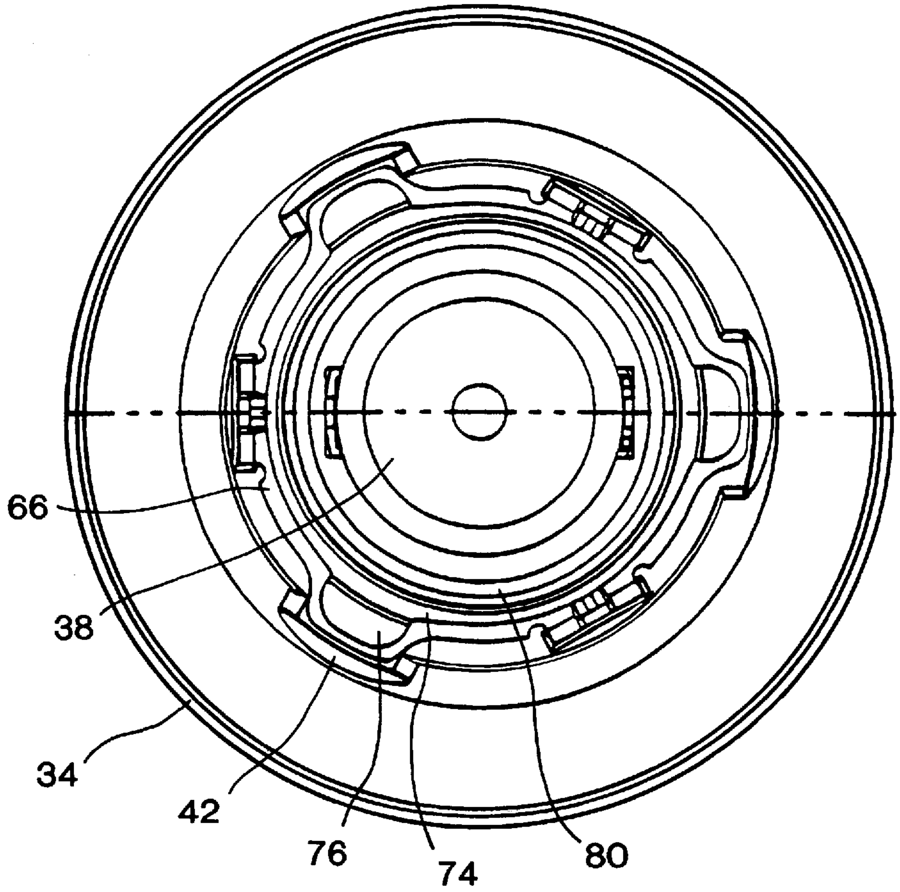
FIG. 11 shows a top view of a lamp capsule.

80 while blocking light, nonetheless provides substantial air flow around the press seal 88. FIG. 11 shows a top view of a lamp capsule. The capsule further includes lead passages, contact lugs 92, and similar elements as known in the art.

To assemble the lamp capsule, the press seal 88 of the envelope is threaded through the hole in the holding cup 80 to latch the spring tabs 86 to the press seal 88. The cup 80 is positioned adjacent the mounting surface of the pedestal 74, and the pedestal 74 is positioned against the ring clip 66. The light source 38 is then adjusted by moving the cup 80 and the pedestal 74 until the light source 38 is properly located. The cup 80 is then welded to the pedestal 74. The pedestal 74 is then welded to the clip ring 66. This forms completed holder subassembly. The holder subassembly is then aligned with the plastic base 34. The subassembly is then advanced so the lamp leads 90 are threaded through guide holes in the plastic base 34 and mated to their respective contact lugs 92 in the plastic base 34. Meanwhile the clip ring tongues 70 are advanced into the latch recesses, where the tongues 70 latch in place. The subassembly is now coupled to the base 34, completing the lamp capsule 32.

To assemble the reflector and lamp capsule 32, the spring bias(s) 82 is(are) first mounted on the lamp capsule 32. The gasket 64 is then positioned around the lamp capsule 32 adjacent the capsule sealing surface 28. The light source 38 end of the lamp capsule 32 is then advanced into the reflector passage. The spring bias 52 presses against the internal wall 20. The axial follower arms 42, of the lamp capsule 32 are aligned to pass over the low ends of the axial locating ramps 24. After the locating arms 42, have passed the low ends of the ramps 24, the lamp capsule 32 is rotated so the follower arms 42, follow up the ramps 24. The lamp capsule 32 is then advanced axially by the ramping action during the capsule rotation. The rotation advances the lamp capsule 32 in the Z direction while compressing the gasket 64.

The rotation of the lamp capsule 32, causes the follower arms 42, to mate with the locating surfaces 22, finally locating and holding the lamp capsule 32 in the proper axial position. The proper Z location of the lamp capsule 32 is then set. The lamp capsule 32 is then locked in place with the lamp capsule 32 position taken directly from the same surface forming the optical reflector 12. There is then no mispositioning of the lamp capsule 32 with respect to the optical surface 16.

Simultaneously, the spring bias 52 of the lamp capsule 32, engages with the side wall of the internal wall 20 and presses the lamp capsule 32 orthogonal to the lamp axis 18 direction until the locating surface 26, of the internal wall 20 engages the corresponding planar locating surface 44 of the lamp capsule 32. With increasing rotation, the spring bias 52 is forced into greater conformal contact with the surface of the adjacent internal wall 20. This compresses the spring bias 52 forcing the reflector 12 into face to face, conformal, engagement with the lamp capsule 32 along the respective planar surfaces. The proper X and Y locations of the lamp capsule 32 are thereby set, so the lamp capsule 32 is then properly located in the plane orthogonal to the lamp axis 18. The lamp capsule 32 is then locked in place with the X and Y planar positions taken directly from the same surface forming the optical reflector 12. There is then no mispositioning of the lamp capsule 32 in the X and Y plane with respect to the optical surface 16.

While there have been shown and described what are at present considered to be the preferred embodiments of the invention, it will be apparent to those skilled in the art that various changes and modifications can be made herein without departing from the scope of the invention defined by the appended claims.

What is claimed is:

1. A vehicle headlamp system comprising:

a) an optical reflector having an interior side and an exterior side, the interior side having a optical surface; an optical axis defining with the optical surface a forward direction wherein the optical surface faces the forward direction; the reflector having a wall defining a passage formed through the reflector from the exterior side to the interior side, the wall including a positioning surface facing the forward direction as an extension of the optical surface; and b) a lamp capsule supporting a light source, the light source and lamp capsule being sized and shaped to permit insertion of the lamp capsule from the exterior side of the reflector through the passage to position the light source to face the optical surface; the capsule having a locating surface, the positioning surface of the optical reflector being abutted adjacent the locating surface of the lamp capsule to thereby accurately locate the lamp capsule relative to the optical surface.

2. The vehicle headlamp system in claim 1, wherein the reflector further includes a reflector sealing surface, wherein the lamp capsule further includes a capsule sealing surface including, and the system further includes a gasket formed of a resilient material, positioned between the reflector sealing surface, and the capsule sealing surface, thereby forming a seal between the reflector and the capsule holder, and providing a retaining force to hold the axial locating surface in abutment with the axial positioning surface.

3. A vehicle headlamp system comprising:

a) an optical reflector having a optical surface with the optical surface facing a forward direction; an optical axis defining an axial direction, and at least one perpendicular planar direction; a wall defining a passage formed through the reflector, the wall including an axial positioning surface facing the forward direction as an extension of the optical surface, and the wall including a planar positioning surface as an extension of the optical surface; and b) a lamp capsule supporting a light source, the capsule having an axial locating surface, and a planar locating surface, the axial positioning surface and the planar positioning surface of the optical reflector being abutted respectively adjacent the axial locating surface and the planar locating surface of the lamp capsule to thereby accurately locate the lamp capsule relative to the optical surface in the axial and planar directions.

4. The vehicle headlamp system in claim 3 wherein the reflector includes a second planar positioning surface, and the lamp capsule includes a second planar locating surface and the second positioning surface abuts the second locating surface.

5. The vehicle headlamp system in claim 3, further including a spring bias pressing between the reflector and the capsule providing a locating force between the reflector and the capsule to press at least the planar locating surface of the reflector into contact with the planar positioning surface of the capsule.

6. The vehicle headlamp system in claim 5 further including a spring bias located on the lamp capsule.

7. The vehicle headlamp system in claim 5 wherein the lamp capsule includes a cavity to guide and retain the action of the spring bias.

8. The vehicle headlamp system in claim 5 wherein the spring bias includes a contact face to press and slide against the reflector wall.

9. The vehicle headlamp system in claim 5 wherein the spring bias is an arched band located in the formed passage, between the reflector and the holder having an uncompressed form that is not conformal with either the adjacent reflector wall or the adjacent holder wall.

10. A vehicle headlamp system comprising:

a) an optical reflector having a optical surface, with the optical surface facing a forward direction; and a wall defining a passage formed therethrough, the wall including an axial positioning surface, and a planar positioning surface, each positioning surface comprising an extension of the optical surface, the reflector having a reflector sealing surface around the formed passage;

b) a lamp capsule including a holder having an axial locating surface, and a planar locating surface, the axial positioning surface and the planar positioning surface of the optical reflector being respectively adjacent the axial locating surface and the planar locating surface of the lamp capsule; and including a spring bias providing a force between the reflector and the lamp capsule to press the planar locating surface into abutment with the planar positioning surface, the capsule having a capsule sealing surface around the capsule; and c) a gasket formed of a resilient material, positioned between the reflector sealing surface, and the capsule scaling surface, forming a seal between the reflector and the capsule holder and providing a force to press the axial locating surface against the axial positioning surface;

d) the holder further retaining a light source having leads extending therefrom, the leads passing through the holder, and e) connectors supported in the holder and coupled to the leads to provide electrical connection to the light source.

11. A vehicle headlamp capsule comprising:

a light source with an envelope with a wall, the wall defining an enclosed volume, the envelope having an axis, and a press seal, wherein electric leads for the light source extend from the enclosed volume through the press seal, a metal holder having a retainer, and a support, the retainer coupling with the light source adjacent the press seal, the retainer being coupled to the support, and a plastic base fixedly holding the support, the plastic base having passages formed to pass the electric leads through the plastic base to couple with contact lugs held by the plastic base;

wherein the retainer includes a cup having a sidewall and a bottom, the bottom being formed with a through passage, the press seal being coupled to the retainer in the through passage, the sidewall being offset from the light source, extending around the light source and extending from the coupling with the press seal in a direction parallel to the axis and toward the light source.

12. The headlamp capsule in claim 11, wherein the sidewall extends in a direction parallel to the axis to be perpendicularly offset from where the leads extend from the wall into the enclosed volume, thereby blocking axially transverse transmission of light from the light source reflecting from the press seal.

13. The headlamp capsule in claim 11, wherein the cup has a light absorbing interior surface.

14. A vehicle headlamp capsule comprising:

an envelope with a wall, the wall defining an enclosed volume, a light source positioned in the enclosed volume, the envelope having an axis, and a press seal, wherein electric leads from the light source extend through the press seal, a metal holder having a retainer, and a support, the retainer coupling with the envelope adjacent the press seal, the retainer being coupled to the support, and a plastic base fixedly holding the support, the plastic base having passages formed to pass the electric leads through the plastic base to couple with contact lugs held by the plastic base;

wherein the support includes a pedestal and a coupler, the pedestal having a contact surface to position the retainer; the pedestal further having coupling contact points positioned in a plane substantially perpendicular to the lamp axis, and the coupler being joined to the plastic base, and having a surface coplanar with the contact points, thereby allowing adjusting movements of the pedestal with respect to the coupler in the plane prior to fixed coupling of the pedestal to the coupler.

15. The headlamp capsule in claim 14, wherein the coupler includes a clip portion providing a resilient latch for secure coupling of the holder; and the plastic base includes a formed latch receptacle to couple with the resilient latch to support the holder in fixed relation to the plastic base.

16. The headlamp capsule in claim 15, wherein the clip portion includes a plate portion providing three contact points positioned in a plane to support and couple to the pedestal; and wherein the plastic base supports the plate.

17. The headlamp capsule in claim 15, wherein the clip portion includes a resilient latch arm extending parallel to the lamp axis to latch in a receptacle formed in the base.

18. A vehicle headlamp capsule comprising:

a light source having an axis and an envelope, the envelope having a press seal wherein electric leads for the light source extend through the press seal, a metal holder coupling with the envelope adjacent the press seal, the metal holder having a cup having a sidewall and a bottom, the bottom being formed with a through passage, the press seal being coupled to the cup in the passage formed through the bottom, the sidewall being offset from the envelope, extending around the envelope and extending from the coupling with the press seal in a direction parallel to the axis and toward the light source to be perpendicularly offset from all of the press seal, thereby blocking axially transverse transmission of light from the light source by the press seal, a pedestal having a contact surface to position the cup for axial, and rotational adjustment prior to permanent mechanical coupling of the cup; the cup being coupled to the pedestal in an adjusted position;

a clip providing a mechanical support for the pedestal, the clip having a resilient latch for secure coupling; and a plastic base having a formed latch receptacle to couple with the clip resilient latch to support the metal holder, the electric leads passing through the plastic base to couple with contact lugs held by the plastic base.

19. A vehicle headlamp capsule comprising:

a light source having an envelope defining an enclosed volume, the envelope having an axis, and a press seal axially aligned on one side of the envelope, wherein electric leads for the light source enter the press seal and extend through the press seal into the enclosed volume, a metal holder coupling with the envelope adjacent the press seal, having a cup having a sidewall and a bottom, the bottom being formed with a through passage, the press seal being held in the passage formed through the bottom, the sidewall being offset from the envelope, extending around the envelope and extending adjacent the press seal from the bottom to at least a position axially perpendicular and offset from where the leads enter the press seal nearest the light source, the sidewall thereby blocking light transmitted axially perpendicular from the press seal, a pedestal having a contact surface to position the cup for axial, and rotational adjustment prior to permanent mechanical coupling of the cup; the cup being coupled to the pedestal in an adjusted position; the pedestal further having coupling contact points positioned in a plane perpendicular to the axis, thereby allowing adjusting movements of the pedestal in the plane prior to the fixed coupling of the pedestal, a clip providing a mechanical support for the pedestal contact points, and a resilient latch for secure coupling of the clip; and a plastic base having a formed latch receptacle to couple with the clip resilient latch to support the metal holder, the electric leads passing through the plastic base to couple with contact lugs held by the plastic base.

20. A vehicle headlamp capsule comprising:

an envelope with a wall defining an enclosed volume, the envelope having an axis and a press seal, a light source being positioned in the enclosed volume, the light source having electric leads that enter and extend through the press seal, a metal holder coupling with the envelope adjacent the press seal, having a cup having a sidewall and a bottom, the bottom being formed with a through passage, the press seal being held by the cup in the through passage, the sidewall being offset from the envelope, extending around the envelope and extending adjacent the press seal from the bottom to a position at least axially perpendicular to where the leads enter the press seal nearest the light source thereby blocking light transmitted axially perpendicular from the press seal,;

a pedestal having a contact surface to position the cup for axial, and rotational adjustment prior to permanent mechanical coupling to the cup; the cup being coupled to the pedestal in an adjusted position;

a clip providing a mechanical support for the pedestal, and a resilient latch for secure coupling of the clip; and plastic base having formed latch receptacles to couple with the resilient latch to support the metal holder, the electric leads passing through the plastic base to couple with contact lugs held in the plastic base.

* * * * *